United States Patent
Suzuki

(10) Patent No.: US 8,692,122 B2
(45) Date of Patent: Apr. 8, 2014

(54) GROMMET

(75) Inventor: Takashi Suzuki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 108 days.

(21) Appl. No.: 13/369,400

(22) Filed: Feb. 9, 2012

(65) Prior Publication Data

US 2012/0325521 A1  Dec. 27, 2012

(30) Foreign Application Priority Data

Jun. 24, 2011  (JP) .................................. 2011-140871

(51) Int. Cl.
*H01B 17/26* (2006.01)

(52) U.S. Cl.
USPC ................... 174/153 G; 174/152; 174/152 G; 248/56; 16/2.2; 439/604

(58) Field of Classification Search
USPC ........ 174/152, 152 G, 153 G; 248/56; 16/2.1, 16/2.2; 439/604
See application file for complete search history.

(56) References Cited

U.S. PATENT DOCUMENTS 7,915,535 B2 * 3/2011 Carter ....................... 174/152 G
8,097,819 B2 * 1/2012 Su ................................. 174/665

FOREIGN PATENT DOCUMENTS

JP          2005-65354          3/2005

* cited by examiner

*Primary Examiner* — Dhirubhai R Patel
(74) *Attorney, Agent, or Firm* — Gerald E. Hespos; Michael J. Porco; Matthew T. Hespos

(57) ABSTRACT

A grommet is fit on a pipe harness formed by inserting a wire harness into a metallic pipe. The grommet has a small-diameter tube configured to allow insertion of the pipe harness therethrough in a tight manner. The small-diameter tube has an inner diameter B obtained by adding an allowable tolerance dimension α to an outer diameter A of the pipe. Two annular ribs project from an outer peripheral surface of the small-diameter tube on the side of a distal end opening and a band winding portion is interposed between the annular ribs. An annular sealing lip projects from an inner peripheral surface of the small-diameter tube at an inner position displaced from a position corresponding to the band winding portion. The sealing lip has an inner diameter C obtained by subtracting the allowable tolerance dimension α from the outer diameter A of the pipe.

5 Claims, 5 Drawing Sheets

GROMMET

BACKGROUND OF THE INVENTION

1. Field of the Invention

The invention relates to a grommet configured to fit on a wire harness routed in a motor vehicle and to be mounted in a through hole of a vehicle body panel to prevent entry of water, dust, and noise into a vehicle passenger compartment from the outside of the passenger compartment.

2. Description of the Related Art

A grommet for a wire harness is formed of rubber or elastomer, and includes a small-diameter tube and a large-diameter tube. The small-diameter tube is configured so that a wire group that constitutes the wire harness can be fit tightly therein. The large-diameter tube increases in diameter continuously from an outer periphery of the small-diameter tube and has outer peripheral surface with an annular vehicle body locking depression. The small-diameter tube of the grommet is expanded with an expanding jig so that the wire harness can be inserted therein. An adhesive tape then is wound from a distal end of the small-diameter tube of the grommet to an outer peripheral surface of the wire harness to fix the grommet to a predetermined position on the wire harness.

The inventor of the present application has proposed using a binding band 100 instead of adhesive tape to fix a grommet 101 to a wire harness 102, as shown in FIG. 7 herein and as described in JP-A-2005-65354.

FIG. 8 shows a recent pipe harness 110 for a hybrid motor vehicle or an electric motor vehicle. The pipe harness 110 includes a wire harness 102 that is passed through a metallic pipe 111 and a grommet 120 that is fit on the pipe 111. The pipe harness 110 is routed under a floor of the vehicle, and the grommet 120 is fit into a through hole in a floor panel, as shown in FIG. 8. A resin binding band 130 is wound around a small-diameter tube 121 of the grommet 120 to fasten the small-diameter tube 121 tightly on an outer peripheral surface of the pipe 111.

More specifically, two annular ribs 122A and 122B project out on an outer peripheral surface of a distal end of the small-diameter tube 121 of the grommet 120, and a band winding portion 124 is defined between the ribs 122A and 122B. A band 131 of the binding band 130 is wound on the winding portion 124 and is drawn through a main body 133 and pulled to lock a locking strip of the main body 133 in a locking groove of the band 131.

The grommet is molded of a resilient material and is thin to be brought into tight contact with the outer peripheral surface of the pipe 111 on the outer periphery of the wire harness. In contrast, the binding band 130 is a molded resin. Thus, if the band 131 is pulled strongly when fastening, the metal pipe 111 is subject to slippage. Therefore, as shown in FIG. 8(B), a gap G tends to be formed between the small-diameter tube 121 and the pipe 111 as the band 131 pulls the winding portion 124 of the small-diameter tube 121 of the grommet. Water can enter through the gap G from the underfloor and into the passenger compartment.

An annular sealing lip 125 has been provided on an inner periphery of the band winding portion 124 of the small-diameter tube 121 of the grommet 120, as shown in FIG. 8(C), to avoid forming the gap G. However, the sealing lip 125 also is pulled when the band winding portion 124 is pulled by the band 131, and hence the gap G is not eliminated completely.

The gap between an inner periphery of the band winding portion 124 and the outer peripheral surface of the pipe 111 can be prevented by setting the inner diameter of the small-diameter tube 121 equal to the outer diameter of the pipe 111, as shown in FIG. 8(D). However, when the inner diameter of the small-diameter tube 121 of the grommet equals the outer diameter of the pipe 111, an inner peripheral surface of the small-diameter tube 121 sticks to the outer peripheral surface of the pipe 111 as the pipe 111 is being fed through the small-diameter tube 121 of the grommet, which hinders a smooth through-feed operation. Therefore, a lubricating agent 140 must be filled between the pipe 111 and the small-diameter tube 121. However, the lubricating agent 140 can cause the pipe 111 to slip when the band 131 of the binding band 130 is wound around the outer peripheral surface of the small-diameter tube 121. Hence the small-diameter tube 121 cannot be fixed adequately at a predetermined position on the pipe 111 even when the band 131 is fastened.

In view of the above-described problems, it is an object of the invention to provide a grommet that enables a metal pipe of a pipe harness to be inserted easily through the small diameter tube of the grommet without using a lubricating agent, while also achieving a tight contact. It is also an object of the invention to prevent slippage between the pipe and the small-diameter tube and to prevent formation of a gap that could cause entry of water when fastening the small-diameter tube of the grommet on the pipe with a binding band.

SUMMARY OF THE INVENTION

The invention relates to a grommet to be fit on a pipe harness that is formed by inserting a wire harness into a metallic pipe. The grommet includes a small-diameter cylindrical tube configured to allow insertion of the pipe harness therethrough in a tight manner. The small-diameter tube has an inner diameter B that is equal to an outer diameter A of the pipe plus an allowable tolerance dimension $\alpha$ (B=A+$\alpha$). Two axially spaced annular ribs project from a distal end of an outer peripheral surface of the small-diameter tube and a band winding portion is defined between the annular ribs to accommodate a binding band. An annular sealing lip projects from an inner peripheral surface of the small-diameter tube at an inner position displaced from a position corresponding to the band winding portion. The sealing lip has an inner diameter C obtained by subtracting the allowable tolerance dimension a from the outer diameter A of the pipe (C=A−$\alpha$).

Setting the inner diameter B of the small-diameter tube to be larger than the outer diameter A of the pipe by $\alpha$ allows the pipe to be inserted into the small-diameter tube without problem even when a lubricating agent is not used. Also, the inner diameter C of the sealing lip is A−$\alpha$, which allows a distal end of the sealing lip to be pressed against an outer peripheral surface of the pipe. Thus, no gap will be formed between the pipe and the small-diameter tube to allow entry of water. Also, the sealing lip is at an inner position of the small-diameter tube spaced from the band winding portion where the binding band is wound. Thus, the sealing lip is pressed against the outer peripheral surface of the pipe even when the band winding portion of the small-diameter cylindrical tube is pulled by the band so that water cannot enter.

The thickness of the small-diameter tube of the grommet preferably is 1 mm to 3 mm, and the allowable tolerance dimension ($\alpha$) preferably falls within a range from 0.1 mm to 3 mm.

The sealing lip on the inner peripheral surface of the small-diameter tube preferably includes plural sealing lips arranged in an axial direction.

The grommet preferably is a grommet for a pipe harness that has a plurality of wires configured to connect a battery and an inverter or to connect the inverter and a motor of a hybrid automotive vehicle or an electric vehicle. The wires are inserted into a pipe formed of aluminum-based metal and the grommet is configured to be mounted in a through hole in a floor panel. The grommet may be a two-piece grommet having a grommet body formed of rubber or elastomer and a resin inner member formed of a molded resin combined to each other. The grommet body includes the small-diameter tube to be fit on the pipe harness in a tight contact manner. A large diameter closed wall may continue from an outer periphery of an opening of the small-diameter tube and a peripheral wall projects from an outer peripheral edge of the closed wall and includes an annular locking recess configured to allow insertion and locking of the resin inner member. The resin inner member includes a flange configured to be inserted in and locked with the locking recess. An annular frame may project from an inner peripheral edge of the flange. Circumferentially spaced lock claws may be provided on the annular frame and may be fixed into through holes. The other end of the small-diameter portion of the grommet body projects from a distal end of the annular frame of the resin inner member and has the band winding portion on an outer periphery of a projection.

Plural small-diameter tubes may be provided in parallel on the grommet according to the number of pipe harnesses to be passed therethrough.

The small-diameter tube may be oblique and continuous according to the direction of routing of the pipe harness.

The shape of the grommet is not limited to the shapes described above, and a configuration in which the grommet has only the grommet body formed of rubber or the like, and the grommet body may have a large-diameter portion provided with an annular vehicle body locking depression configured to be locked with a through hole formed on a vehicle body panel on an outer peripheral surface thereof and the small-diameter tube continued from the large-diameter portion is also applicable.

An inner diameter of a small-diameter tube with a band winding portion on an outer periphery thereof is slightly larger than an outer diameter of a pipe of the pipe harness. Thus, the necessity of applying a lubricating agent between an outer peripheral surface of the pipe and an inner peripheral surface of the small-diameter tube is eliminated. Also, a sealing lip is provided on an inner side with respect to the band winding portion and an inner diameter of the sealing lip is smaller than the outer diameter of the pipe. Thus, the sealing lip can be pressed against the outer peripheral surface of the pipe to ensure the sealing.

DETAILED DESCRIPTION OF THE PREFERRED EMBODIMENTS

Figure 1:
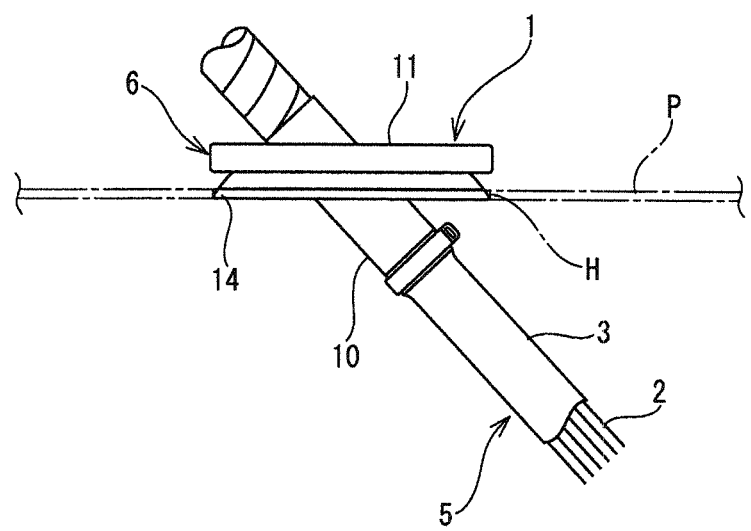
FIG. 1 is a front view showing a state in which a pipe harness is passed through a grommet of a first embodiment and the grommet is attached to a floor panel.

A grommet in accordance with a first embodiment of the invention is identified by the numeral 1 in FIGS. 1 to 5. The grommet 1 is for pipe harnesses 5 each having a plurality of wires 2 inserted through an aluminum-based metallic pipe 3 and configured to connect a battery and an inverter or an inverter and a motor of a hybrid automotive vehicle or an electric automotive vehicle. The grommet 1 is configured to be mounted in a through hole H formed in a floor panel P.

Figure 2A:
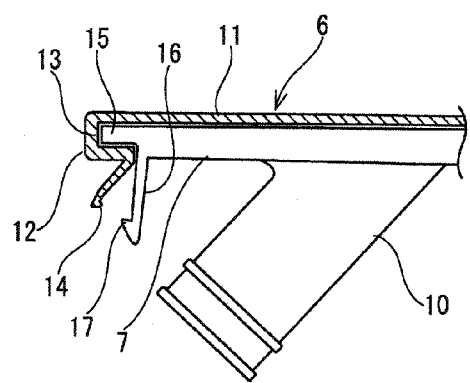
FIG. 2(A) is a partly enlarged cross-sectional view.
Figure 2B:
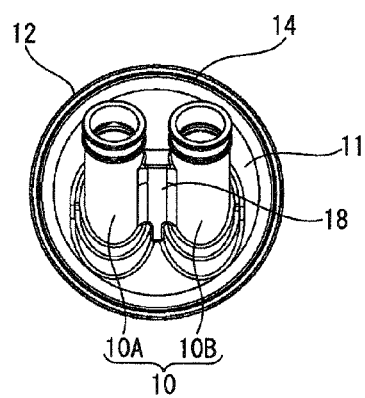
FIG. 2(B) is a bottom view.
Figure 2C:
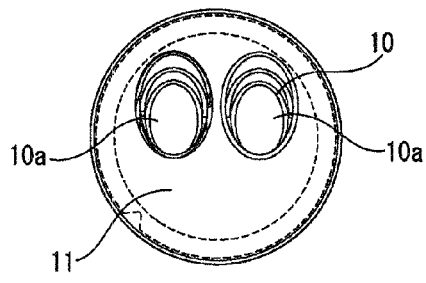
FIG. 2(C) is a plan view.

The grommet 1 includes a grommet body 6 formed of rubber or elastomer and a resin inner member 7, as shown in FIG. 2. The grommet body 6 includes two small-diameter cylindrical tubes 10A, 10B configured to be fit tightly on two pipe harnesses 5. A closed wall 11 continues from outer peripheries of first end openings 10a of the small-diameter tubes 10A, 10B, and a peripheral wall 12 projects from an outer peripheral edge of the closed wall 11. The peripheral wall 12 includes an annular lock 13 with a depression that allows insertion and locking of the resin inner member 7. A sealing lip 14 projects radially out from a distal end of the annular lock 13. The resin inner member 7 includes a flange 15 configured to be inserted into and locked with the annular lock 13. An annular frame 16 projects from an inner peripheral edge of the flange 15, and lock claws 17 project from the annular frame 16 at 90° intervals in the circumferential direction. The lock claws 17 are to be fixed to through holes.

The flange 15 of the resin inner member 7 is inserted into the annular lock 13 of the grommet body 6. Thus, the lock claws 17 on the annular frame 16 of the resin inner member 7 project from an inner peripheral side of the sealing lip 14, and the small-diameter tubes 10A, 10B project from an inner peripheral side of the annular frame 16.

The small-diameter tubes 10A, 10B of the grommet body 6 are inclined with respect to the closed wall 11, and have the first end openings 10a through the closed wall 11 that are ellipsoidal. A connecting wall 18 connects the two small-diameter tubes 10A and 10B to hold the two small-diameter tubes 10A and 10B in a row and in an inclined state.

Figure 3A:
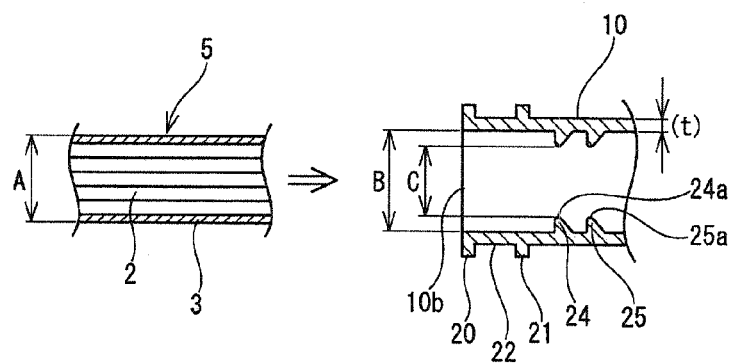
FIG. 3(A) and FIG. 3(B) are cross-sectional views showing a small-diameter cylindrical tube of the grommet.
Figure 3B:
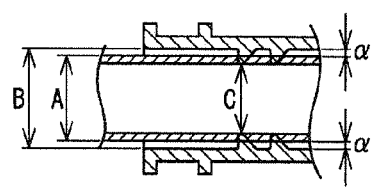

A first annular rib 20 is disposed on an outer peripheral surface at a distal end of each tube 10A, 10B and a second annular rib 21 is spaced proximally from each first annular rib 22 with a band winding portion 22 between the annular ribs 20 and 21, as shown in FIG. 3.

Annular sealing lips 24 and 25 project from an inner peripheral surface on the side of a connecting portion with respect to the closed wall 11 at positions displaced from the position of the band winding portion 22.

An inner diameter B of each of the small-diameter tube 10A, 10B is (A+α), which is a value obtained by adding an allowable tolerance dimension α to an outer diameter A of the pipe 3 of the pipe harness 5. In addition, an inner diameter C of the sealing lips 24, 25 projecting from the inner peripheral surface of the small-diameter tubes 10A, 10B displaced from the band winding portion 22 is (A−α), which is a dimension obtained by subtracting the allowable tolerance dimension α from the outer diameter A of the pipe 3.

As described above, by setting the inner diameter B of each small-diameter tube 10 to be (A+α), which is larger than the outer diameter A of the pipe 3 by α, the pipe 3 is allowed to be inserted into the small-diameter tube 10 without problem even when a lubricating agent is not used. Also, the inner diameter C of the sealing lips 24 and 25 is set to be (A−α), which is a dimension allowing distal ends of the sealing lips 24 and 25 to be pressed against an outer peripheral surface of the pipe 3. The sealing lips 24 and 25 project toward projecting ends at an acute angle, so that distal ends 24a, 25a can be deflected easily.

The dimension (α) is adjusted according to a thickness (t) and an outer diameter of the pipe 3, and falls within a range from 0.1 mm to 3 mm. The thickness (t) of the small-diameter tubes 10 falls within a range from 1 mm to 3 mm.

Figure 4:
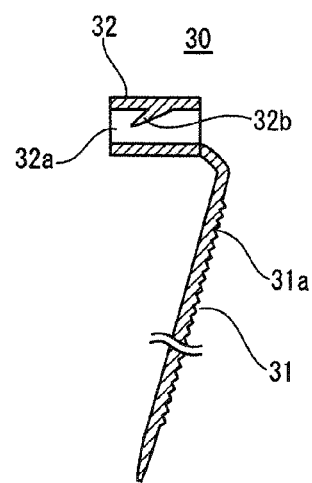
FIG. 4 is a cross-sectional view of a binding band.
Figure 7:
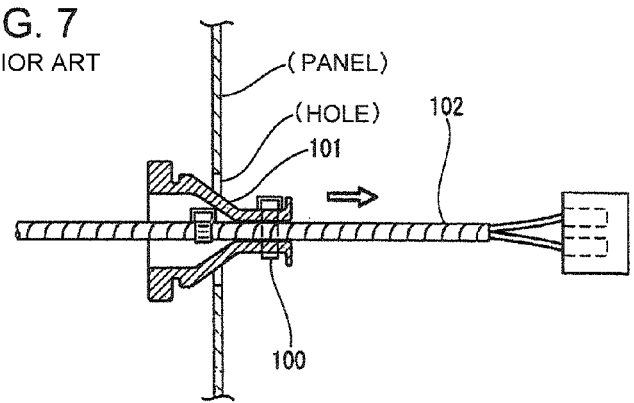
FIG. 7 is a drawing showing a related art.
Figure 8A:
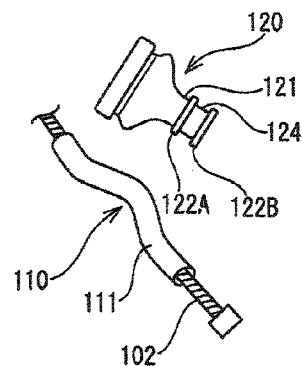
FIGS. 8(A) to 8(D) show another related art.
Figure 8B:
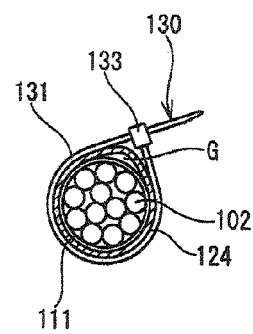
Figure 8C:
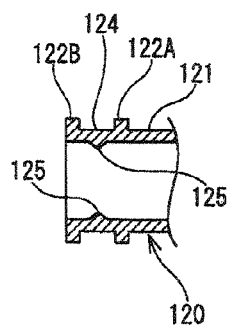
Figure 8D:
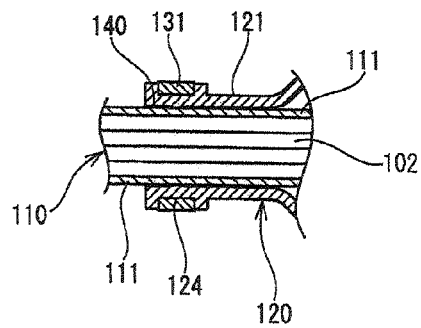

A binding band 30 is wound around the band winding portion 22 of the small-diameter tube 10 after having inserted the pipe harness into the small-diameter tube 10 so that the small-diameter tube 10 is tightened and fixed immovably to the pipe harness 5. The binding band 30 may be a known resin binding band, such as the binding band shown in FIG. 7. The binding band 30 includes a band 31 with sawtooth-shaped continuous locking grooves 31a that project from a fastening portion 32, as shown in FIG. 4. The binding band 30 is configured to achieve fastening by winding the band 31 around the band winding portion 22, then inserting the band 31 though a through hole 32a on the fastening portion 32 and pulling the band 31, and then locking a locking strip 32b projecting from an inner peripheral surface of the through hole 32a with the locking grooves 31a of the band 31.

The pipe harness 5 that has been inserted into the small-diameter tube 10 of the grommet 1 and fastened with the binding band 30 must be fixed to the floor panel P at a position of the through hole H where the grommet 1 is to be mounted. Then, an entry of water from the outside of the passenger compartment on the underside of the floor where the small-diameter tubes 10 project into the passenger compartment needs to be prevented when the grommet 1 is mounted in the through hole H of the floor panel P.

Figure 5:
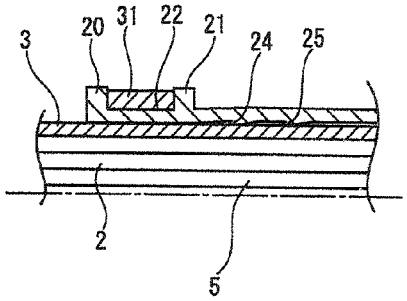
FIG. 5 is a partly cross-sectional view showing a state in which the pipe harness is passed through the grommet and is fastened with the binding band.

The grommet 1 is mounted to the pipe harness 5 by inserting the pipe harness 5 from the opening 10b of the small-diameter tube 10A, 10B. The inner diameter (B) of the small-diameter tube 10A or 10B is larger than the outer diameter (A) of the pipe 3 by the dimension ($\alpha$). Thus, the insertion is achieved easily without a lubricating agent on the inner peripheral surface of the small-diameter tube 10 or the outer peripheral surface of the pipe 3. The distal ends 24a, 25a of the sealing lips 24 and 25 are pressed against the outer peripheral surface of the pipe 3 when the pipe 3 reaches the portion of the small-diameter tube 10A, 10B where the sealing lips 24 and 25 project. However, the sealing lips 24 and 25 are tapered and hence have flexibility at the distal end. Thus, the sealing lips 24 and 25 are bent easily. Therefore, as shown in FIG. 5, the pipe 3 can be inserted into the small-diameter tube 10 while pressing the sealing lips 24 and 25 against the outer peripheral surface of the pipe 3.

The band 31 of the binding band 30 is wound around the band winding portion 22 on the outer peripheral surface of the small-diameter tube 10 after having inserted the pipe 3 into the small-diameter tube 10. The band 31 is inserted into the through hole 32a of the fastening portion 32 and pulled. Thus, the locking strip 32b projecting from the inner peripheral surface of the through hole 32a engages the locking grooves 31a of the band 31. When pulling this band 31, there is a gap of the dimension ($\alpha$) between the small-diameter tube 10 on the side of an inner peripheral surface of the band 31 and the outer peripheral surface of the pipe 3. Hence, the small-diameter tube 10 is fastened in a state of becoming crinkled on the side of the gap with respect to the pipe 3 rather than being pulled by the band 31. Therefore, no significant gap will exist between the inner peripheral surface of the small-diameter tube 10 and the pipe 3 so that the small-diameter tube 10 will not be pulled by the band 31. Also, granted that the gap is generated as a result that the small-diameter tube 10 is pulled out by the band 31, the gap is formed only at the portion of the band winding portion 22, and the portion of the small-diameter tube 10 where the sealing lips 24 and 25 are provided on the inner side with respect to the band winding portion 22 is not pulled out. Therefore, the sealing lips 24 and 25 are not pulled out, and hence the portion between the outer peripheral surface of the pipe 3 and the inner peripheral surface of the small-diameter tube 10 can be sealed reliably with the sealing lips 24 and 25. Accordingly, water will not enter into the grommet 1 due to the generation of a gap on the side of the opening 10b of the small-diameter tube 10.

When fastening the small-diameter tube 10 to the pipe 3 of the pipe harness 5 using the binding band 30, there is no lubricating agent filled between the small-diameter tube 10 and the pipe 3. Therefore, there is no slippage occurring between the small-diameter tube 10 and the pipe 3, so that the small-diameter tube 10 can be fixed to a preset position of the pipe 3. In this manner, when the pipe harness 5 is inserted into the small-diameter tube 10 of the grommet 1 without using the lubricating agent, assembleability of the grommet with respect to the pipe harness is significantly improved.

Figure 6:
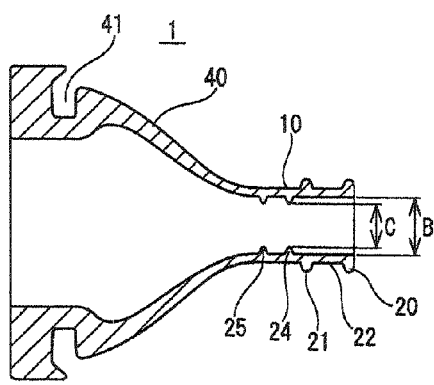
FIG. 6 is cross-sectional view of a grommet of a second embodiment.

FIG. 6 shows a grommet according to a second embodiment.

The grommet is a one-piece grommet molded using elastomer, and is different from the two-piece grommet including the resin inner member in the first embodiment.

The grommet 1 includes an enlarged-diameter tube 40 continuously at an end of the small-diameter tube 10 and is provided with a vehicle body locking depression 41 in an annular shape on a large-diameter-side outer peripheral surface of the large-diameter tube 40. The sealing lips 24 and 25, which are similar to those in the first embodiment, are provided to project from the inner peripheral surface of the small-diameter tube 10 projecting from a continuous end of the large-diameter tube, and ribs 20, 21 are provided so as to project from the outer peripheral surface of the small-diameter tube 10 on the outer side with respect to the positions where the sealing lips 24 and 25 are formed, whereby the band winding portion 22 is provided.

The relation of the inner diameter (B) of the small diameter tube 10 and the inner diameter (C) of the sealing lips 24 and 25 with respect to the outer diameter (A) of the pipe 3 of the pipe harness 5 inserted therethrough are set to be the same as that in the first embodiment. Since other configuration and advantages are the same as those in the first embodiment, the same reference numerals are allocated and the description will be omitted.

The invention is not limited to the first and second embodiments described above, and the number of the sealing lips projecting from the inner peripheral surface of the small-diameter tube of the grommet is not limited to two, and it may be either three or one.

What is claimed is:

1. A grommet to be fit on a pipe harness formed by inserting a wire harness into a metallic pipe, comprising:
    a small-diameter tube having opposite front and rear ends and configured to allow insertion of the pipe harness therethrough in a tight manner, the small-diameter tube having an inner diameter obtained by adding an allowable tolerance dimension to an outer diameter of the pipe;
    two axially spaced annular ribs projecting from an outer peripheral surface of the small-diameter tube near a the front end of the small-diameter tube;
    a band winding portion between the annular ribs; and
    at least one annular sealing lip projecting from an inner peripheral surface of the small-diameter tube at position between the rear end of the small-diameter tube and the band winding portion and displaced from both the rear end of the small-diameter tube and the band winding portion, the sealing lip having an inner diameter obtained by subtracting the allowable tolerance dimension from the outer diameter of the pipe.

2. The grommet of claim 1, wherein the allowable tolerance dimension falls within a range from 0.1 mm to 3 mm.

3. The grommet of claim 1, wherein the at least one sealing lip that projects from the inner peripheral surface of the small-diameter tube comprises a plurality of axially spaced sealing lips.

4. A two-piece grommet for a pipe harness that has a plurality of wires configured to connect a battery and an inverter or the inverter and a motor of a hybrid automotive vehicle or an electric vehicle, the wires being inserted into a pipe formed of aluminum-based metal, the grommet being configured to be mounted in a through hole formed in a floor panel, the two-piece grommet having a grommet body formed of rubber or elastomer and a resin inner member formed of a resin mold combined to each other, the grommet body including at least one small-diameter tube to be fit tightly on the pipe harness, a large diameter closed wall continuing from an outer periphery of an opening of the small-diameter tube and a peripheral wall provided to project from an outer peripheral edge of the closed wall and includes a lock formed of an annular recess configured to allow insertion and locking of the resin inner member, the resin inner member includes a flange configured to be inserted in and locked with the lock, an annular frame projecting from an inner peripheral edge of the flange, and a plurality of lock claws provided on the annular frame at intervals in a circumferential direction and configured to be fixed into through holes, and a band winding portion on an outer periphery of the small-diameter tube and at an end of the small-diameter tube that is opposite the closed wall of the grommet body and projecting from the resin inner member.

5. The grommet of claim 4, wherein plural of the small-diameter tubes are provided on the grommet, the plural small-diameter tubes are arranged in a row, and are connected by a connecting portion.

* * * * *